Oct. 17, 1939.  W. A. RIDDELL  2,176,844
SETTING SHUTTER
Filed March 16, 1938
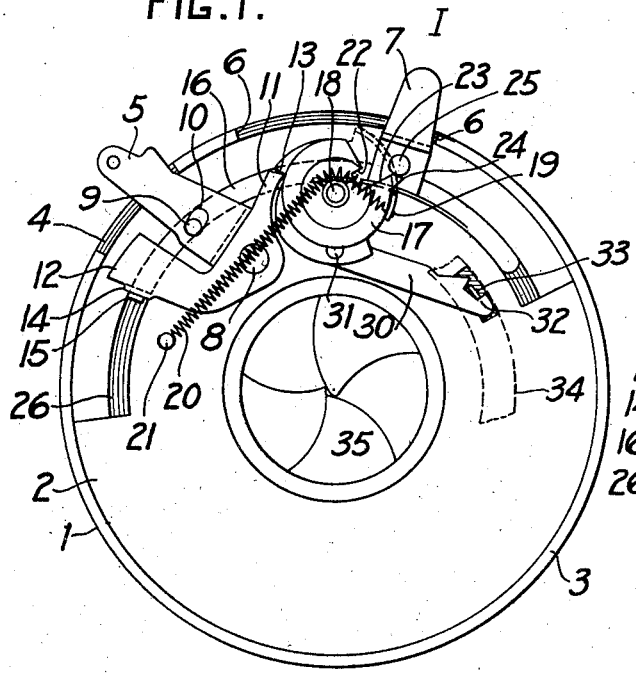
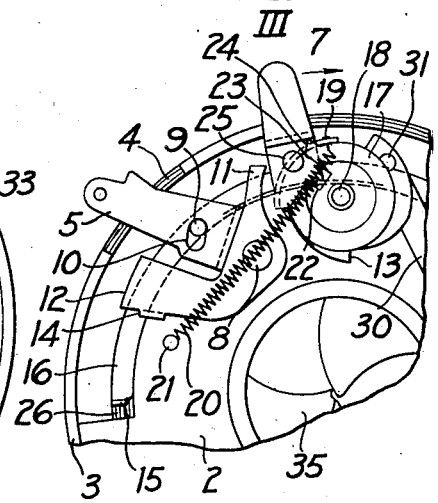
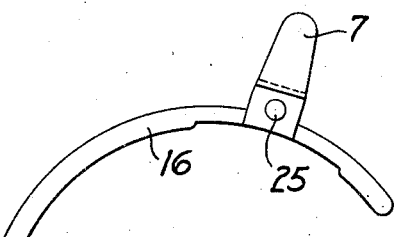
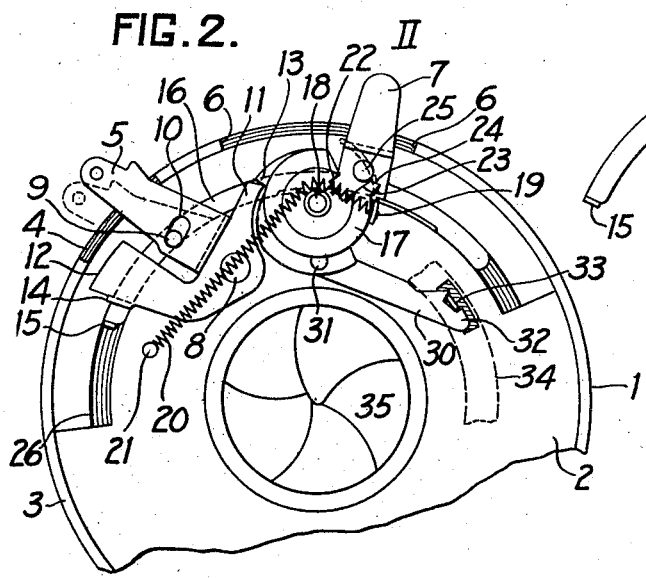
WILLIAM A. RIDDELL
INVENTOR
BY
ATTORNEYS Patented Oct. 17, 1939

2,176,844

UNITED STATES PATENT OFFICE 2,176,844

SETTING SHUTTER

William A. Riddell, Rochester, N. Y., assignor to Eastman Kodak Company, Rochester, N. Y., a corporation of New Jersey Application March 16, 1938, Serial No. 196,193

13 Claims. (Cl. 95—63)

This invention relates to photography and more particularly to photographic camera shutters of the type in which a setting lever is moved to place the main operating spring under tension, so that by pressing on the trigger, an exposure may be made.

An object of my invention is to provide a shutter of the type described in which the setting lever and the master member are provided with a lost motion connection so arranged that the master member may be moved to a set position through a portion of the movement of the setting lever and the remaining portion of the movement of the setting lever may take place without affecting the master member. Another object of my invention is to provide a shutter particularly adapted for use on cameras having double exposure prevention devices in which there is mechanism connecting the shutter setting lever with controls carried by the camera body. Still another object of my invention is to provide a shutter in which the master member is definitely locked against movement after being set by the master member and to provide movable connections between the shutter trigger and shutter setting lever for moving the latter to release the master member in advance of releasing the shutter through the trigger. Still another object of my invention is to provide a setting shutter with a setting lever which may be moved through a stroke considerably longer than necessary for setting the shutter. Another object of my invention is to provide a more efficient shutter by lessening the work done by the master member. Another object of my invention is to provide a setting shutter with a means for moving the setting lever by the trigger. Another object of my invention is to provide a shutter with a manually operated means to assist the master member in starting an exposure, and other objects will appear from the following specification, the novel features being particularly pointed out in the claims at the end thereof.

Coming now to the drawing wherein like reference characters denote like parts throughout:

Fig. 1 is a top plan view of a shutter constructed in accordance with and embodying a preferred form of my invention. In this view the shutter cover has been removed and the parts are shown in a set position.

Fig. 2 is a fragmentary plan view similar to Fig. 1, but with the parts shown in position for the shutter to operate.

Fig. 3 is a fragmentary plan view similar to the preceding figures, but with the parts shown as they would appear when an exposure is made, the trigger having been depressed and the master member having returned to its normal position of rest.

Fig. 4 is a plan view of the shutter setting lever removed from the shutter mechanism.

With cameras employing double exposure prevention devices, it is sometimes necessary to provide connections between the shutter and the camera body which control the setting of the shutter by means of the film wind. A typical example of such a structure is shown in the copending application Serial No. 168,774, filed October 13, 1937, Harmon & Green, for Roll holding camera. It is to be understood that various other connections between camera bodies and setting shutters may be used in connection with such cameras, but in all such connections where there are a series of links, levers and gears or the like, it is almost impossible to provide all of these movable parts without having a certain amount of play between the parts, so that it is usually quite difficult to move a shutter lever such as a shutter setting lever with such accuracy that only the desired movement will be accomplished. For instance, it is difficult to move the setting lever a distance just sufficient for the trigger to latch the master member because with normal shutters, the setting lever moves only so long as the master member moves, and if the play in connecting parts with the camera body is not properly taken up, the setting movement cannot occur.

I have, therefore, particularly designed a shutter in which there is play or lost movement between the setting lever and master member, permitting the former to continue to move after moving the latter as far as is required for setting the shutter. I have also provided a shutter in which the master member is latched against movement by the setting lever which places it under tension, this being an additional safeguard to prevent accidental operation of the shutter. In order to release the setting lever latch, I have provided connections between the trigger and the setting lever so arranged that slight movement of the trigger moves the setting lever to release the master member, after which, further movement of the trigger releases the master member to move to make an exposure.

An important feature of my invention resides in that my improved shutter is more efficient than known types, because a portion of the force usually required of the master member for operating the shutter is eliminated because the setting lever is set in motion before the master member is tripped, thus greatly lessening the starting load in the master member.

While my invention is designed for use on different types of shutters which require setting before an exposure can be made, the present invention is particularly adapted for use on shutters of the type shown in my Patent 2,099,866, granted November 23, 1937.

Referring now to Fig. 1 of the drawing, the shutter may comprise a casing 1 in which a plate 2 is mounted, about which there is an upstanding flange 3. The flange 3 is provided with a cut-out notch 4, through which a trigger 5 may operate, and with a cut-out slot, the ends of which 6 are indicated in the drawing through which a shutter setting lever 7 may pass.

The trigger 5 is mounted upon a pivot 8 carried by the shutter plate 2 and its movement may be limited by a pin 9 and a slot 10 passing through the trigger. The trigger has two arms 11 and 12, the former being adapted, with the lug 13, to form a latch for holding the master member in a set position, and the latter being provided with a downwardly extending lug 14 which may engage an upwardly extending lug 15 carried by an arcuate arm 16 forming a part of the shutter setting lever 7, the function of which will be hereinafter more fully described.

The master member 17 may be pivoted at 18 and may be attached at 19 to a power spring 20, the opposite end of which 21 is anchored on the plate 2. The master member is provided with a short slot between the walls 22 and 23, the latter wall terminating in a shoulder 24. When the shutter is in an unset position, the master member 6 lies in the position shown at III in Fig. 3 with the setting pin 25 in engagement with one of the walls 23 of the slot so that by moving the setting lever in the direction shown by the arrow in Fig. 3, the arcuate arm 16 will be moved through the arcuate slot 26, and as the pin 25 engages the wall 23, the master member will be turned to tension the spring 20. Thus, the parts may be moved to the position shown by I, and in this position it will be noted that the pin 25 lies on top of the shoulder 24. Since the pin moves in an arc, due to the arcuate member 16 and the slot 26 which is concentric with the shutter casing 1, the master member is held against movement in a counter-clockwise direction. Any sudden jar applied to the shutter will not release this connection because the spring 20 is constantly holding the shoulder 24 against the pin 25. If the latch elements 11—13 were moved by the trigger 5, the master member would still be held against movement except for the fact that the downwardly projecting lug 14 of the trigger arm 12 is in engagement with the upwardly extending lug 15 on the setting lever 7. Consequently, just as soon as the trigger 5 is moved, the shutter setting lever is moved and the pin 25 with it is moved from the position shown at I to the position shown at II, in which the setting lever no longer latches the master member, and when the trigger 2 is pressed still further down, or to the position of Fig. 3, the spring 20 causes the master member to move rapidly just as soon as the latch elements 11—13 are disengaged. When this occurs, the master member moves so fast that the lug 15 is rapidly driven away from the lug 14 as an exposure is made, so that these parts will not again come into contact until the shutter is again set, as indicated in Fig. 1.

Like most shutters of this type, the master member carries a latch 30 pivoted to the master member at 31 and having a hook 32 engaging the upstanding pin 33 carried by the blade ring 34 which is pivoted to, and operates the shutter leaves 35 in a known manner.

With a shutter constructed as described above, it should be noticed that after the master member has been completely set, the setting lever 7 may still move the distance equal to the position shown between the setting levers of Fig. 1 and Fig. 2. This distance may be made as large as is desirable. In the present shutter, it amounts to perhaps a sixteenth of an inch. Thus, the mechanism which connects the setting lever with the shutter need not be formed with extreme accuracy, because it is only necessary to move the setting lever a distance past the position shown at II, in Fig. 2, to set the shutter and to allow for any play which may occur in the parts connecting the lever with the shutter setting mechanism. Moreover, when the master member has been set, and the setting lever is in the position shown at I, the master member is not only held latched against movement by the trigger, but is also latched against movement by the setting lever.

By depressing the trigger, the master member is manually moved towards its normal or inoperative position of rest shown at III. Any inertia in the parts is thus overcome and the spring 20 is thus rendered more effective because the force required for moving the setting lever 7 with its arcuate plate 16 does not fall upon the spring 20 but is taken up by the trigger 5. Having first started the setting lever moving before releasing the latch elements 11—13, as soon as these latch elements are released, the spring 20 picks up the moving setting lever 7 and quickly moves it in a counter-clockwise direction. Thus, with the construction above described, the shutter is actually more efficient than where there is no connection between the trigger and the setting lever because in such cases the master member not only has to overcome its own inertia, but the inertia of the setting lever.

From the standpoint of the operator there is no difference between the operation of this shutter and any other shutter of the setting type. The shutter is either set manually by the setting lever, or it may be set through suitable connections with the camera body. Whatever the setting means, the setting lever is moved from position III to position II, in which the master member has been fully set and latched in a set position, as shown in Fig. 2. However, the movement of the setting lever 7 is continued past the position shown in Fig. 2, leaving the master member in this position while the setting lever alone moves to the position shown at I in Fig. 1. In this position, the lug 15 has been brought up against the lug 14 of the shutter arm 12. The pin 25 has been brought over the top of the shoulder 24.

To make an exposure with the parts shown in Fig. 1, the trigger 5 is depressed so that the lug 15 moves the setting lever back to the position shown at II and a slight further movement of the trigger 5 releases the latch elements 11—13. Since the setting lever moves in a clockwise direction with the trigger, the setting lever is already moving at the time that the master member 17 begins its movement under the impulse of spring 20. Consequently, the master member, through the wall 23 engaging the pin 25, rapidly drives the setting lever towards its inoperative position of rest, shown in Fig. 3.

What I claim is:

1. In a photographic shutter, the combination with a movably mounted master member, of a movably mounted setting member, cooperating elements on the two members for causing relative movement between the two in two directions, a spring adapted to drive the master member in one direction, a trigger for holding the master member in a set position, the shape of the cooperating elements on the setting and master members permitting lost motion between the former with respect to the latter, whereby the setting lever may be moved a distance greater than necessary to latch the setting lever by the trigger in a set position, and a lug on the setting lever adapted to be positioned adjacent a portion of the trigger during the setting movement whereby the setting member may be manually moved by the trigger at least until the master member is released.

2. In a photographic shutter, the combination with a movably mounted master member, of a movably mounted setting member, cooperating elements on the two members for causing relative movement between the two in two directions, a spring adapted to drive the master member in one direction, a trigger for holding the master member in a set position, the shape of the cooperating elements on the setting and master members permitting lost motion between the former with respect to the latter whereby the setting lever may be moved a distance greater than necessary to latch the setting lever by the trigger in a set position, and a lug on the setting lever adapted to be positioned adjacent a portion of the trigger during the setting movement, the first portion of the trigger movement moving said setting lever through its lug toward a position in which further movement may be caused by the cooperating elements on the setting and master members, thereby starting movement of the setting member by the trigger and completing said movement by the master member.

3. In a photographic shutter, the combination with a movably mounted master member, of a movably mounted setting member, cooperating elements on the two members for causing relative movement between the two in two directions, a spring adapted to drive the master member in one direction, a trigger for holding the master member in a set position, the shape of the cooperating elements on the setting and master members permitting lost motion between the former with respect to the latter whereby the setting lever may be moved a distance greater than necessary to latch the setting lever by the trigger in a set position, and means for returning the setting lever to its initial position in which the shutter is not set including said trigger and master member, cooperating elements on the trigger and setting member positioned to initiate movement of the setting member manually moving it into a position from which the cooperating elements forming the lost motion connection between the setting and master members may continue the movement started by the trigger.

4. In a photographic shutter, the combination with a movably mounted master member, of a movably mounted setting member, cooperating elements on the two members for causing relative movement between the two in two directions, a spring adapted to drive the master member in one direction, a trigger for holding the master member in a set position, the shape of the cooperating elements on the setting and master members permitting lost motion between the former with respect to the latter whereby the setting lever may be moved a distance greater than necessary to latch the setting lever by the trigger in a set position, and means for returning the setting lever to its initial position in which the shutter is not set including said trigger and master member, cooperating elements on the trigger and setting member positioned to initiate movement of the setting member manually moving it into a position from which the cooperating elements forming the lost motion connection between the setting and master members may continue the movement started by the trigger, the cooperating elements on the trigger and master member being positioned to contact only after the setting member has been moved to set the shutter.

5. In a photographic shutter, the combination with a movably mounted master member, of a movably mounted setting member, cooperating elements on the two members for causing relative movement between the two in two directions, a spring adapted to drive the master member in one direction, a trigger for holding the master member in a set position, the shape of the cooperating elements on the setting and master members permitting lost motion between the former with respect to the latter whereby the setting lever may be moved a distance greater than necessary to latch the setting lever by the trigger in a set position, and combined manual and spring means for moving the setting lever as the shutter is operated, said spring means including the master member and said lost motion connection between the setting and master members, and the manual means including an arm and lug movable with the setting lever into the path of the trigger as the shutter is set, whereby the trigger movement necessary to release the master member positively moves the lug and setting lever.

6. In a photographic shutter, the combination with a movably mounted master member, of a movably mounted setting member, cooperating elements on the two members for causing relative movement between the two in two directions, a spring adapted to drive the master member in one direction, a trigger for holding the master member in a set position, the shape of the cooperating elements on the setting and master members permitting lost motion between the former with respect to the latter whereby the setting lever may be moved a distance greater than necessary to latch the setting lever by the trigger in a set position, and combined manual and spring means for moving the setting lever as the shutter is operated, said spring means including the master member and said lost motion connection between the setting and master members, and the manual means including an arm and lug movable with the setting lever into the path of the trigger as the shutter is set, whereby the trigger movement necessary to release the master member positively moves the lug and setting lever, the location of said lug relative to the trigger being such that the setting lever may be driven by the master member separating said lug from the trigger as the master member drives the setting lever through said spring.

7. In a photographic shutter, the combination with a pivoted master member, a spring tending to turn the master member in one direction, a trigger, interengaging latch elements on the trigger and master member adapted to hold the latter in a set position, a setting lever, a lost motion connection between the setting lever and master member comprising a pin and slot, the slot extending between two walls one of which has a shoulder portion, said lost motion connection permitting said pin to ride out of the slot onto the shoulder, whereby the master member may be held against movement by the setting lever, cooperating elements on the trigger and setting lever to move the latter by the former to release the master member for operation as the pin is brought into the slot therein.

8. In a photographic shutter, the combination with a pivoted master member, a spring tending to turn the master member in one direction, a trigger, interengaging latch elements on the trigger and master member adapted to hold the latter in a set position, a setting lever, a lost motion connection between the setting lever and master member comprising a pin and slot, the slot extending between two walls one of which has a shoulder portion, said lost motion connection permitting said pin to ride out of the slot onto the shoulder, and means for returning the pin into the slot comprising interengaging members on the trigger and setting lever through which the latter may be moved by the former.

9. In a photographic shutter, the combination with a shutter casing, of a master member pivotally mounted therein, a shutter trigger, interengaging latch members on the trigger and master member, a shutter setting lever mounted to turn on the casing through a predetermined range of movement, interengaging members on the master member and setting lever for moving the former from the latter, said interengaging members on the master member and setting lever being so proportioned that said setting lever interengaging member may slip off the master member interengaging member and may continue to move after the master member has come to rest and is held in set position by the interengaging latch members.

10. In a photographic shutter, the combination with a shutter casing, of a master member pivotally mounted therein, a shutter trigger, interengaging latch members on the trigger and master member, a shutter setting lever mounted to turn on the casing and including parts slidably engaging parts of the master member for moving the latter to a set position in which it is held by the interengaging latch members, said slidable engagement of the several parts moving the master member through a portion only of the predetermined range of movement of the setting lever, until the engaging part of the setting lever slips off the engaging part of the master member.

11. In a photographic shutter, the combination with a casing, of a shutter trigger mounted therein, a master member adapted to be latched in an operative position by the trigger, a spring for moving the master member and adapted to be tensioned when the latter is moved to an operative position, a setting lever for setting the master member and placing the spring under tension when moved in one direction, and connections between the trigger and master member for moving the latter from the former in a direction opposite to the setting movement in advance of releasing the master member.

12. In a photographic shutter, the combination with a casing, of a shutter trigger pivotally mounted therein, a master member movably mounted in the shutter and adapted to be latched by the trigger in an operative position, a spring for moving the master member tensioned by moving the master member to its operative position, said trigger releasing the master member when moved in one direction, a setting lever movable in a direction opposite to that of the trigger in releasing the master member for setting the master member, and means controlled by the trigger for starting the setting lever movement in the same direction as the trigger movement in releasing the shutter in advance of moving the setting lever by the master member.

13. In a photographic shutter, the combination with a casing, of a shutter trigger pivotally mounted therein, a master member pivotally mounted in the shutter casing, a spring adapted to move the master member, a setting lever mounted to contact with and set the master member against spring tension, a part on the setting member adapted to move with and slip off of cooperating parts on the master member, said setting member being adapted to move with said master member in making an exposure, and connections between the trigger and setting lever for moving the latter in a direction in which the master member is driven by the spring for making an exposure until the setting lever part contacts with said master member parts and the master member is released by said trigger, whereby the inertia of starting the setting lever may not have to be overcome by the master member.

WILLIAM A. RIDDELL.